(12) United States Patent
Xu et al.

(10) Patent No.: US 12,017,296 B2
(45) Date of Patent: Jun. 25, 2024

(54) MULTI-SOURCE SELF-ADAPTIVE LOW-STRESS ADDITIVE MANUFACTURING DEVICE

(71) Applicant: BEIJING INSTITUTE OF TECHNOLOGY, Beijing (CN)

(72) Inventors: Chunguang Xu, Beijing (CN); Wenjun Zhang, Beijing (CN); Bo Yang, Beijing (CN); Wenkai Li, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 18/353,160

(22) Filed: Jul. 17, 2023

(65) Prior Publication Data
US 2024/0091875 A1 Mar. 21, 2024

(30) Foreign Application Priority Data
Jul. 28, 2022 (CN) .......................... 202210911731.6

(51) Int. Cl.
*B23K 20/00* (2006.01)
*B22F 12/00* (2021.01)
(Continued)

(52) U.S. Cl.
CPC ............ *B23K 20/10* (2013.01); *B22F 12/226* (2021.01); *B22F 12/30* (2021.01); *B33Y 30/00* (2014.12)

(58) Field of Classification Search
CPC .. B33Y 30/00; B23K 26/342; B23K 15/0086; B23K 31/125
See application file for complete search history.

(56) References Cited

U.S. PATENT DOCUMENTS 11,167,375 B2 * 11/2021 Schiffres ................. B22F 10/28
11,286,194 B2 * 3/2022 Missout ................... B22F 12/53
(Continued)

FOREIGN PATENT DOCUMENTS

CN 107225244 A 10/2017
CN 109175364 A 1/2019
(Continued)

*Primary Examiner* — Erin B Saad
(74) *Attorney, Agent, or Firm* — John A Miller; Shumaker, Loop & Kendrick LLP

(57) ABSTRACT

A multi-source self-adaptive low-stress additive manufacturing apparatus including a multi-axis manipulator additive manufacturing system, a high-energy sound beam regulation system, a substrate and a self-adaptive additive manufacturing workbench. The multi-axis manipulator additive manufacturing system includes multi-axis manipulator(s), welding torch(es), manipulator controller(s) and a guide rail, where base(s) of the multi-axis manipulator(s) is connected with the guide rail, the welding torch(es) is held by distal end(s) of the multi-axis manipulator(s), the multi-axis manipulator(s) is controlled by the manipulator controller(s) to move the welding torch(es) to conduct low-stress additive manufacturing on the workpiece to be additive manufactured. The high-energy sound beam regulation system includes one or more high-energy sound beam exciters, each having a high-energy sound beam excitation unit and a titanium alloy special adiabatic amplitude transformer so as to realize the regulation of residual stress generated in the additive manufacturing process of the workpiece.

9 Claims, 5 Drawing Sheets

(51) Int. Cl.
*B22F 12/30* (2021.01)
*B23K 20/10* (2006.01)
*B33Y 30/00* (2015.01)

(56) References Cited

U.S. PATENT DOCUMENTS

| | | | |
|---|---|---|---|
| 11,318,564 B2 * | 5/2022 | Ma | B22F 12/90 |
| 11,413,698 B2 * | 8/2022 | Lobastov | B23K 15/004 |
| 11,708,619 B2 * | 7/2023 | Xu | C21D 1/04 |
| | | | 148/508 |
| 2017/0059529 A1 * | 3/2017 | Kamel | C21D 1/34 |
| 2018/0147670 A1 * | 5/2018 | Wiggins | B33Y 10/00 |
| 2020/0270712 A1 * | 8/2020 | Xu | B23P 9/04 |
| 2022/0021467 A1 * | 1/2022 | Bae | H04B 11/00 |
| 2022/0250328 A1 * | 8/2022 | Buller | B22F 10/38 |
| 2023/0014858 A1 * | 1/2023 | DeMuth | B22F 12/70 |
| 2023/0147300 A1 * | 5/2023 | Allenberg-Rabe | B33Y 30/00 |

FOREIGN PATENT DOCUMENTS

| | | |
|---|---|---|
| CN | 113118466 A | 7/2021 |
| CN | 113634763 A | 11/2021 |
| CN | 113909503 A | 1/2022 |
| CN | 114381627 A | 4/2022 |
| WO | 2020062341 A1 | 4/2020 |

* cited by examiner

MULTI-SOURCE SELF-ADAPTIVE LOW-STRESS ADDITIVE MANUFACTURING DEVICE

CROSS-REFERENCE TO RELATED APPLICATIONS

This application claims priority to China Patent Application Serial No. 202210911731.6 filed Jul. 28, 2022, the entire disclosure of which is herein incorporated by reference.

BACKGROUND

Field

The present disclosure relates to the field of stress control of additive manufacturing, in particular to a multi-source self-adaptive low-stress additive manufacturing apparatus.

Discussion of Related Art

In recent years, the additive manufacturing technology has developed rapidly. Aluminum alloy and titanium alloy materials are widely applied to the fields of aerospace, aviation, national defense and the like due to excellent mechanical and mechanical properties, and have the characteristics of short processing periods and high efficiency. However, these materials have small elastic modulus and low thermal conductivity, and have the problems of violent raw material additive process, complex temperature variation, difficult prediction of molten pool conditions and the like in the additive manufacturing process. As a result of these problems, residual stress concentration in the internal or local areas of the final product leads to deformation, even cracking. To ensure sufficient strength and good reliability of the additive manufactured workpiece, it is necessary to eliminate and homogenize residual stresses that arise from the additive manufacturing process.

The commonly used residual stress reduction method includes a natural aging method, a vibration aging method, a heat treatment method and the like. The natural aging method has low residual stress eliminating efficiency and needs to occupy a large amount of field for a long time. Although the vibration aging method can eliminate residual stress, the method has the limitations that it is difficult to find the resonant frequency between the vibration system and the workpiece, so that the practical application is greatly limited, and the noise of the regulation field is large. The heat treatment method has strict requirements on the process, additional residual stress may be introduced if the treatment such as temperature reduction rate, annealing temperature and the like is improper, and this method has high energy consumption and is not beneficial to environmental protection. For example, patent application No. CN 114381627 A discloses a method and device for eliminating stress deformation of large component in electric arc additive manufacturing process, and patent No. CN 107225244 A discloses a method for adjusting/reducing the internal stress of a laser additive manufacturing part. However, the methods and devices described in the above two patent application documents are relatively complex, which requires a large amount of modifications for the arc additive manufacturing system, including the need to be equipped with a special heat treatment furnace and the like, and the manufacturing cost and time cost are relatively high. These methods are more suitable for stress regulation after additive manufacturing is finished due to the limitation of the mechanism of the method, which is that residual stress in a metal workpiece cannot be synchronously and efficiently homogenized and reduced in the additive manufacturing process on the premise of not modifying the additive manufacturing system in a great extent.

SUMMARY

In view of this, the present disclosure proposes a multi-source self-adaptive low-stress additive manufacturing apparatus, which can apply to an additive manufacturing process, and has the good effect of reducing and homogenizing residual stress and high efficiency without affecting the general additive manufacturing process. By this apparatus, the residual stress can be eliminated synchronously in the additive manufacturing process to ensure the reliability of low-stress additive manufacturing process.

Accordingly, the present disclosure provides a multi-source self-adaptive low-stress additive manufacturing apparatus, comprising: a multi-axis manipulator additive manufacturing system, a high-energy sound beam regulation system, an substrate and a self-adaptive additive manufacturing workbench, wherein the additive manufacturing workbench is in screw connection with the substrate and is configured for fixing a metal workpiece to be additive manufactured;

the multi-axis manipulator additive manufacturing system comprises multi-axis manipulator(s), welding torch(es), manipulator controller(s) and a guide rail, wherein base(s) of the multi-axis manipulator(s) is connected with the guide rail in a slidable manner, the welding torch(es) is held by distal end(s) of the multi-axis manipulator(s), the multi-axis manipulator(s) is controlled by the manipulator controller(s) to move the welding torch(es) to conduct low-stress additive manufacturing on the metal workpiece to be additive manufactured;

the high-energy sound beam regulation system comprises one or more high-energy sound beam exciter, each of which has a high-energy sound beam excitation unit and a titanium alloy special adiabatic amplitude transformer, wherein the high-energy sound beam excitation units connected with the adiabatic amplitude transformer via a coaxial screw rod; and a top end face of the titanium alloy special adiabatic amplitude transformer abuts against a side of the substrate on which the additive manufacturing is not conducted so as to realize the regulation of residual stress generated in the additive manufacturing process of the metal workpiece.

In this way, in the additive manufacturing process by the apparatus, the high-energy sound beams are synchronously injected into the metal workpiece to be additive manufactured in a lossless manner in time and/or space sequence based on the size and residual stress distribution condition of the metal workpiece, and the enabling condition and power parameters of the high-energy sound beam exciter are continuously regulated based on the position and height, ensuring the on-going reduction and homogenization to the residual stress continuously generated in the additive manufacturing process. On one hand, the regulation and excitation of local residual stress induced by high energy sound field is a property of energy transfer from elastic wave-moving particles. By using one or more excitation sources, the focus of multiple high-energy acoustic beams can be realized within a certain range. By means of the action mechanism of high-energy fluctuations on material microstructure, the binding force between metal materials' lattices can be changed, so that the dislocation between lattices can be transitioned from an unstable high-energy state to a stable state. The original energy state between lattices is broken and a new low-energy structure configuration is formed. In this way, the residual stress can be reduced and homogenized. On the other hand, the focusing energy of high-energy sound beams is helpful to eliminate the void and pore defects formed by interlayer holes and element gasification of metal additive workpiece, so that the surface of the regulated metal workpiece is more uniform with less porosity, and the metal work piece has higher strength, thereby realizing the significant improvement of the internal quality and mechanical properties of the metal additive workpiece.

In an embodiment of the present disclosure, the one or more high-energy sound beam exciter each further comprises an amplitude transformer fixing plate, to which the titanium alloy special adiabatic amplitude transformer is connected through hexagon socket head screws, and springs are arranged therebetween to ensure that a movement amplitude of the titanium alloy special adiabatic amplitude transformer in the up-and-down direction has a 1-2 mm allowance; and T-shaped screw nuts are mounted at three corners of the amplitude transformer fixing plate to allow free sliding in a T-shape groove of the self-adaptive additive manufacturing workbench, and the amplitude transformer fixing plates are capable of splicing with each other.

In an embodiment of the present disclosure, a frequency range of high energy sound beam(s) emitted by the one or more high-energy sound beam exciter is 5.0-40.0 KHz, and the power of a single high-energy sound beam excitation unit is more than 1.0 W.

The high-energy ultrasonic wave has a characteristic of beam focusing and directing. By effectively adjusting the frequencies of high energy sound beams, such as P-wave, S-wave, surface wave and guided wave, and the energy level in the focusing region, the focusing region of high energy acoustic beams can be controlled in the specified position in the metal workpiece, so as to reduce and homogenize the residual stress.

In an embodiment of the present disclosure, wherein the titanium alloy special adiabatic amplitude transformer is a ¼ wavelength titanium alloy special adiabatic amplitude transformer or a ½ wavelength titanium alloy special adiabatic amplitude transformer.

The amplitude transformer transmits and focuses the high-energy sound beams. Titanium alloy material has low thermal conductivity, which is about ⅕ of iron and 1/14 of aluminum, so the high heat generated in the material increasing process can be well isolated, ensuring the stability of working performance of the high-energy sound beam exciter.

In an embodiment of the present disclosure, the titanium alloy special adiabatic amplitude transformer is kept closely fitted with a side of the substrate on which the additive manufacturing is not conducted in the additive manufacturing process via heat-resisting sound-transmitting rubber or heat-resisting butter.

The titanium alloy special adiabatic amplitude transformer is kept closely fitted with a side of the substrate on which the additive manufacturing is not conducted so that the residual stress continuously generated in the metal part is efficiently and stably eliminated and homogenized in the regulation process. The end face of the titanium alloy special adiabatic amplitude transformer is coated with heat-resisting sound-transmitting rubber or heat-resisting butter, so that the bottom of the workbench and the amplitude transformer are well in contact, which can ensure that the high-energy sound beams are injected into the metal workpiece continuously in a lossless manner during the additive manufacturing process, thereby ensuring the good effect of the regulation.

In an embodiment of the present disclosure, the manipulator controller(s) is electrically connected with the multi-axis manipulator(s) and is configured for controlling the sliding of the multi-axis manipulator(s) on the guide rail and controlling the moving trajectory of the multi-axis manipulator(s).

In this way, control signals can be generated by the manipulator controller(s) based on the size and position of the metal workpiece to be additive manufactured for controlling the sliding of the multi-axis manipulator(s) on the guide rail and the movement trajectory of the multi-axis manipulator(s), so that the welding torch(es) is controlled by the multi-axis manipulator(s) to conduct the additive manufacturing of the metal workpiece to be additive manufactured.

In an embodiment of the present disclosure, the multi-axis manipulator additive manufacturing system further comprises welder controller(s), which is electrically connected with the welding torch(es) and is configured for controlling the welding torch(es) and acquiring position information of the distal end(s) of the welding torch(es).

In this way, the temperature of the welding torch(es) is controlled by the welder controller(s) in the additive manufacturing process, so as to realize the welding control of the additive manufacturing process. In addition, the welder controller(s) is also used to obtain the position information of the distal end(s) of the welding torch(es), so as to further obtain the position information of the molten pool(s).

In an embodiment of the present disclosure, the high-energy sound beam regulation system further comprises a high-energy sound beam generator, which is electrically connected with the one or more high-energy sound beam exciters to drive the one or more high-energy sound beam exciters to excite high-energy sound beam(s).

In this way, the high energy beam generator drives the one or more high energy beam exciters to coordinately generate the high energy beam(s), in which the enabling level of the high-energy sound beam(s) can be further controlled by changing the power signal of the high-energy beam generator, so as to achieve effective regulation of residual stress and ensure good regulation effect.

In an embodiment of the present disclosure, the apparatus further comprises an industrial personal computer, which is electrically connected with the manipulator controller(s), the welder controller(s), the high-energy sound beam generator and a temperature detection device, respectively, to monitor and control of the additive manufacturing process of the metal workpiece to be additive manufactured, regulation process of the residual stress, and the surface temperature of the metal workpiece.

In this way, the regulation of the residual stress in the additive manufacturing process of the metal workpiece to be additive manufactured is realized by monitoring and controlling of the additive manufacturing process of the metal workpiece to be additive manufactured, regulation process of the residual stress, and the surface temperature of the metal workpiece by means of the industrial personal computer.

In an embodiment of the present disclosure, the self-adaptive additive manufacturing workbench is provided with T-shaped grooves and long circular grooves for adapting the one or more high-energy sound beam exciters to the metal workpieces with different structures.

In this way, the one or more high energy sound beam exciters can slide freely through the T-groove of the self-adaptive additive manufacturing workbench to achieve flexible positioning so that the one or more high energy sound beam exciter can adapt the structure of the metal workpiece to be additive manufactured. Thus, the internal residual stress of the metal workpiece to be additive manufactured can be eliminated and homogenized in a targeted manner.

These and other aspects of the present disclosure will be more readily apparent upon reading of the detailed description of the embodiment(s).

Figure 1:
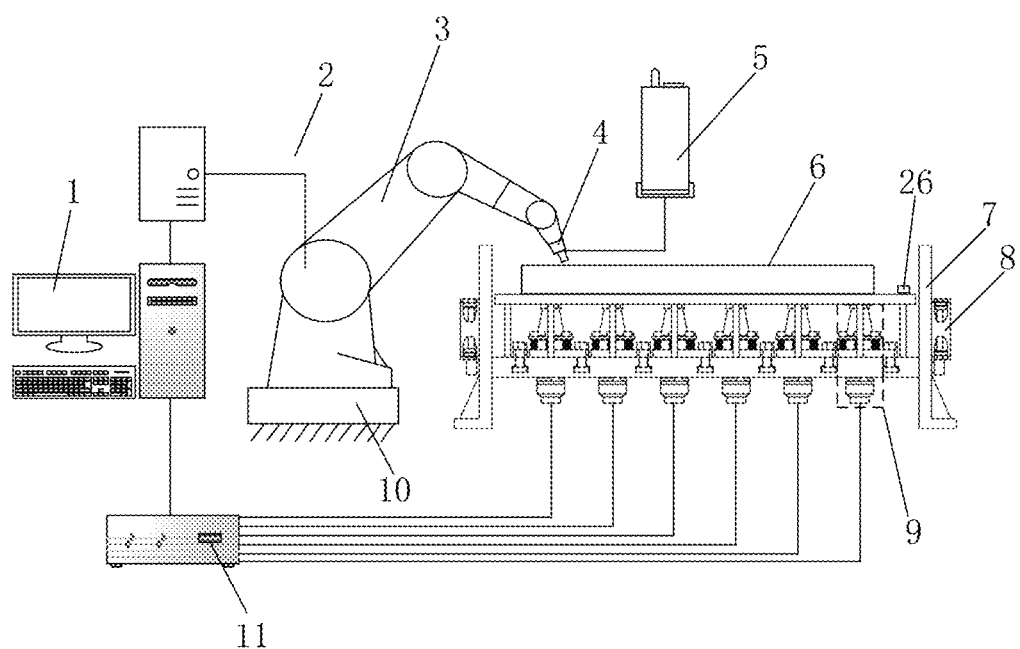
FIG. 1 is a schematic structural diagram of a multi-source self-adaptive low-stress additive manufacturing apparatus according to an embodiment of the present disclosure.

It should be appreciated that the size and form of each block diagram in the above-mentioned schematic structural diagrams are for schematic purposes only and shall not constitute an exclusive interpretation of the embodiments of the present disclosure. The relative positions and the inclusion relationships between the blocks shown in the structural schematic diagrams are for schematic purposes only and shall not limit the physical connection manner of the embodiments of the present disclosure.

The following is a listing of part numbers used in the drawings along with a brief description: 1. industrial personal computer; 2. Manipulator controller; 3. multi-axis manipulator; 4. welding torch; 5. welder controller; 6. metal workpiece to be additive manufactured; 7. self-adaptive additive manufacturing workbench; 8. fan; 9. high-energy sound beam excitation exciter; 10. guide rail; 11. high-energy sound beam generator; 12. vertical plate; 13. substrate; 14. cross plate; 15. fixing screw; 16. fixing screw; 17. titanium alloy special adiabatic amplitude transformer; 18. hexagon socket head screw; 19. spring; 20. T-shaped screw nut; 21. amplitude transformer fixing plate; 22. T-shaped screw; 23. high-energy sound beam exciter; 24. T-shaped groove; 25. long circular groove; 26. temperate detection device.

DETAILED DESCRIPTION OF THE EMBODIMENTS

Further features and advantages of the present disclosure will be more apparent upon reading of the following detailed description with the help of the annexed drawings.

An embodiment of the present disclosure provides a multi-source self-adaptive low-stress additive manufacturing apparatus and a multi-source self-adaptive low-stress additive manufacturing method. The apparatus and the method may apply for an additive manufacturing process, and has good effect of reducing and homogenizing residual stress and high efficiency without affecting the additive manufacturing process. By the apparatus and the method, the residual stress can be eliminated synchronously in the process of additive manufacturing to ensure the reliability of low-stress additive manufacturing process. Referring to FIG. 1, the multi-source self-adaptive low-stress additive manufacturing apparatus according to an embodiment of the present disclosure includes: an industrial personal computer 1, manipulator controller(s) 2, multi-axis manipulator(s) 3, welding torch(es) 4, welder controller(s) 5, a metal workpiece 6 to be additive manufactured, a self-adaptive additive manufacturing workbench 7, fans 8, high-energy sound beam exciter(s) 9, a guide rail 10, a high-energy sound beam generator 11, vertical plates 12, an substrate 13, a cross plate 14, fixing screws 15, fixing screws 16, titanium alloy special adiabatic amplitude transformer(s) 17, hexagon socket head screws 18, springs 19, T-shaped screw nuts 20, amplitude transformer fixing plate(s) 21, T-shaped screws 22, and high-energy sound beam excitation unit(s) 23.

The workpiece 6 to be additive manufactured is fixedly mounted on the self-adaptive additive manufacturing workbench 7. The base(s) of the multi-axis manipulator(s) 3 is connected with the guide rail 10 in a slidable manner. The welding torch(es) 4 is held by the distal end(s) of the multi-axis manipulator(s) 3. The manipulator controller(s) 2 is electrically connected with the multi-axis manipulator(s) 3, and the welding torch(es) 4 is electrically connected with the welder controller(s) 5. The multi-axis manipulator(s) 3 is controlled by the manipulator controller(s) 2 to move the welding torch(es) 4 to conduct low-stress additive manufacturing on the metal workpiece 6 to be additive manufactured.

The top portion(s) of the high-energy sound beam excitation unit(s) 23 and the bottom portions of the titanium alloy special adiabatic amplitude transformer(s) 17 are connected and fixed via coaxial screw rods, and the titanium alloy special adiabatic amplitude transformer(s) 17 then abuts against a side of the substrate 13 on which the additive manufacturing is not conducted. The high-energy sound beam generator 11 is electrically connected with the high-energy sound beam excitation unit(s) 23 to drive the high-energy sound beam excitation unit(s) 23 to emit the high-energy sound beam(s). The emitted high-energy sound beam(s) transmits into the self-adaptive additive manufacturing workbench 7 via the titanium alloy special adiabatic amplitude transformer(s) 17, in order to achieve real-time regulation of residual stress generated in the additive manufacturing process of the metal workpiece 6 to be additive manufactured.

The industrial personal computer 1 is electrically connected with the welder controller(s) 5, the high-energy sound beam excitation unit(s) 23, the manipulator controller(s) 2 and a temperature detection device 26, respectively, controls the states of the manipulator(s) and the high-energy sound beam generator in real time, and adjusts the state of the high-energy sound beam generator in real time by taking position information of the distal end(s) of the welding torch(es) as feedback, so as to monitor and control the additive manufacturing process of the metal workpiece 6 to be additive manufactured, the regulation process of residual stress of the metal workpiece 6 to be additive manufactured, and the surface temperature of the metal workpiece 6 to be additive manufactured.

The titanium alloy special adiabatic amplitude transformer(s) 17 is in direct contact with the bottom of the self-adaptive additive manufacturing workbench 7. High temperature generated in the additive manufacturing process is directly transferred to the titanium alloy special adiabatic amplitude transformer(s) 17 through the bottom plate of the workbench, and the material for the titanium alloy special adiabatic amplitude transformer(s) 17 is thus required to be resistant to high temperature and capable of normally transmitting high-energy sound beam energy in a high-temperature environment to reduce loss of the high-energy sound beam(s). The top portion(s) of the titanium alloy special adiabatic amplitude transformer(s) 17 abuts against the bottom portion of the self-adaptive additive manufacturing workbench 7, and is coated uniformly with a coupling agent, such as heat-resisting sound-transmitting rubber or heat-resisting butter, so that the base of the self-adaptive additive manufacturing workbench 7 is in well contact with the titanium alloy special adiabatic amplitude transformer(s) 17, ensuring that there is no relative displacement within the whole apparatus in the regulation process, the energy loss of high-energy sound beams transmitted to the base of the workbench from the top portion(s) of the titanium alloy special adiabatic amplitude transformer(s) 17 is reduced, and the regulation effect is ensured.

Figure 2:
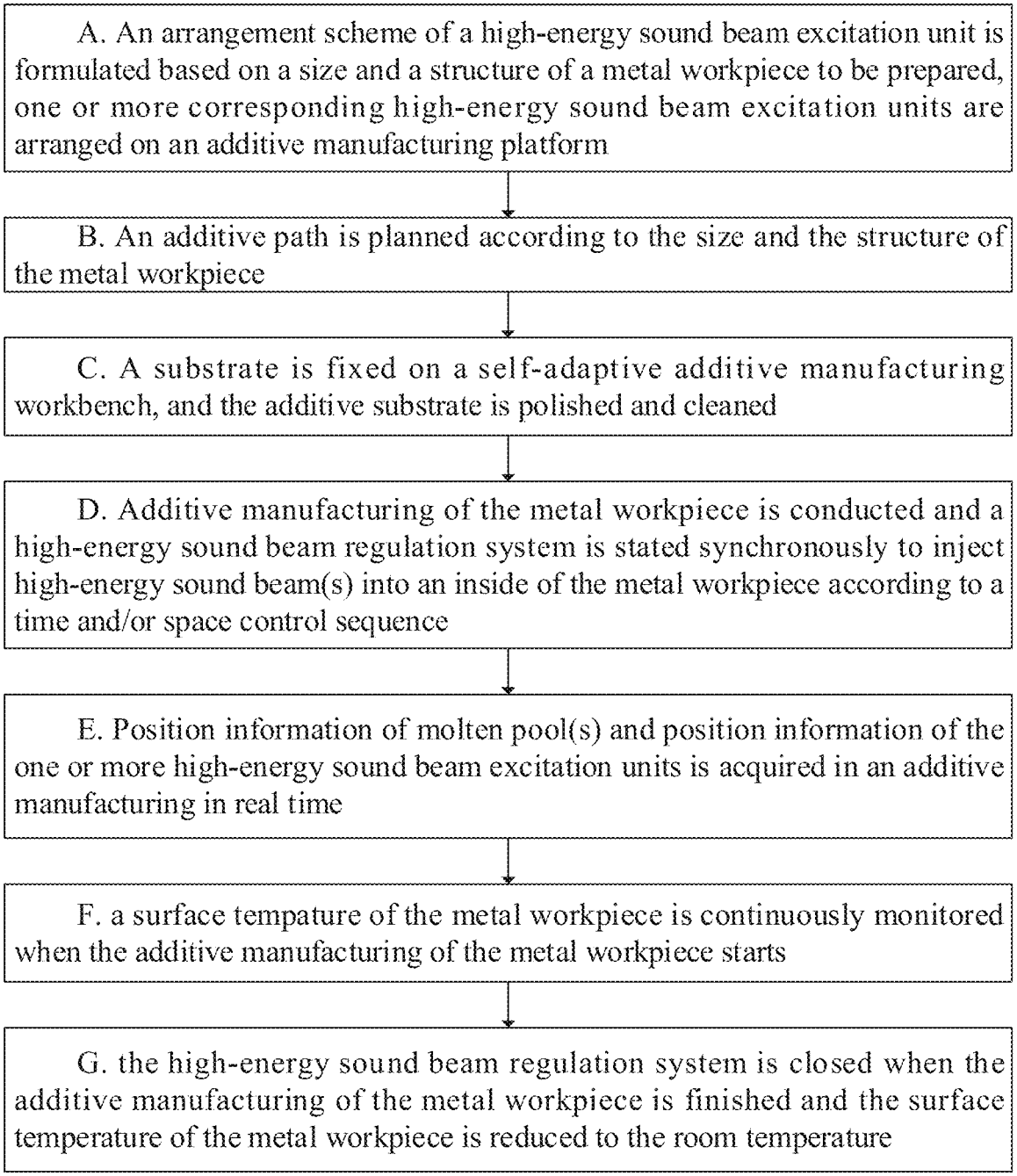
FIG. 2 is a flowchart of a multi-source self-adaptive low-stress additive manufacturing method according to an embodiment of the present disclosure.
Figure 3:
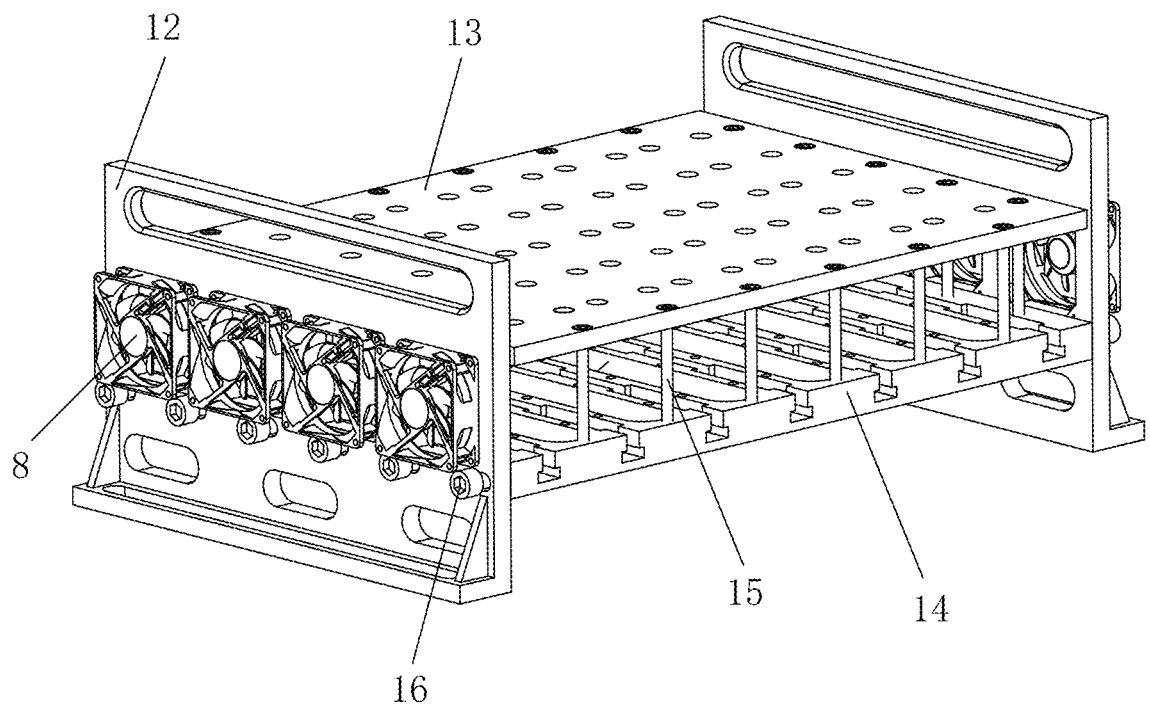
FIG. 3 is a schematic structural diagram of a self-adaptive additive manufacturing workbench according to an embodiment of the present disclosure.
Figure 4:
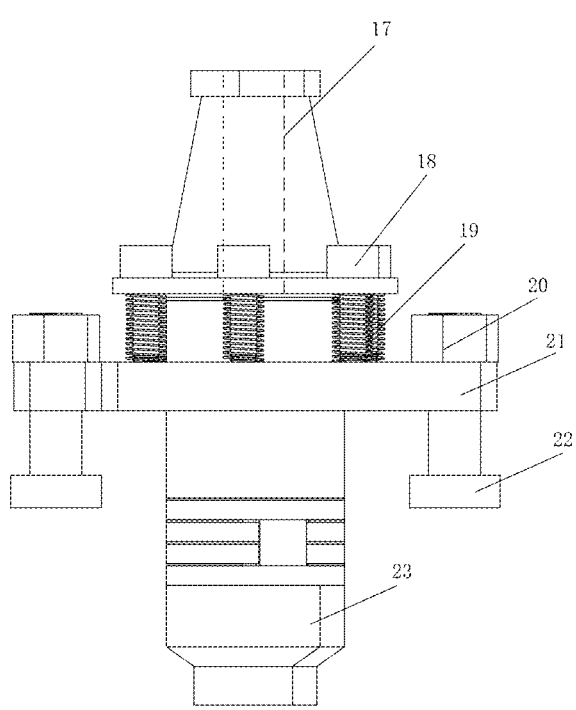
FIG. 4 is a schematic structural diagram of a high-energy sound beam excitation unit according to an embodiment of the present disclosure.
Figure 5:
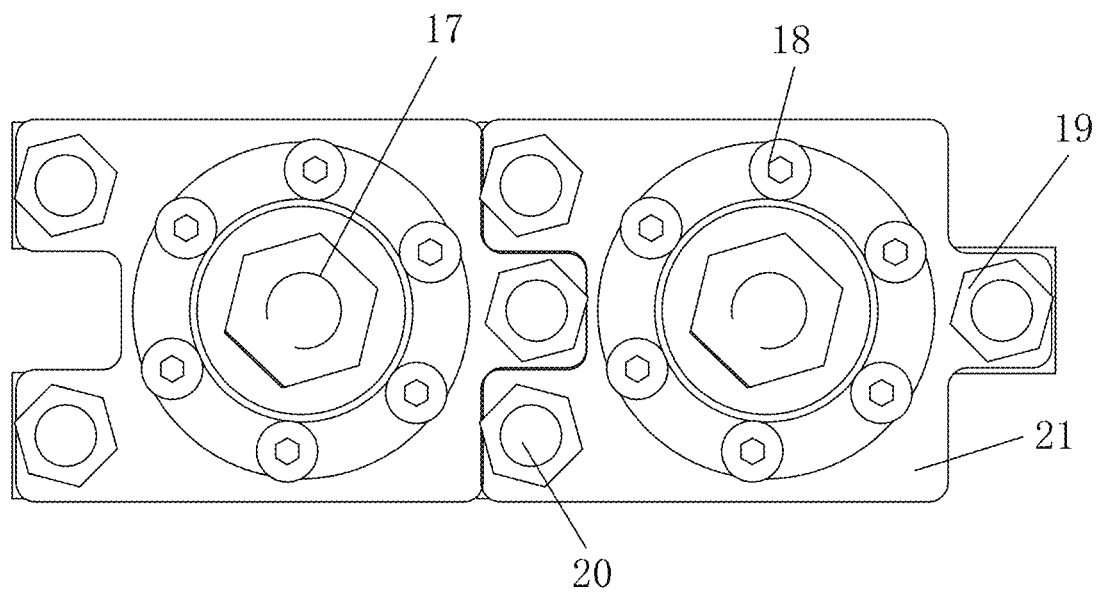
FIG. 5 shows the assembly of two high-energy sound beam excitation units according to an embodiment of the present disclosure in a top view.
Figure 6:
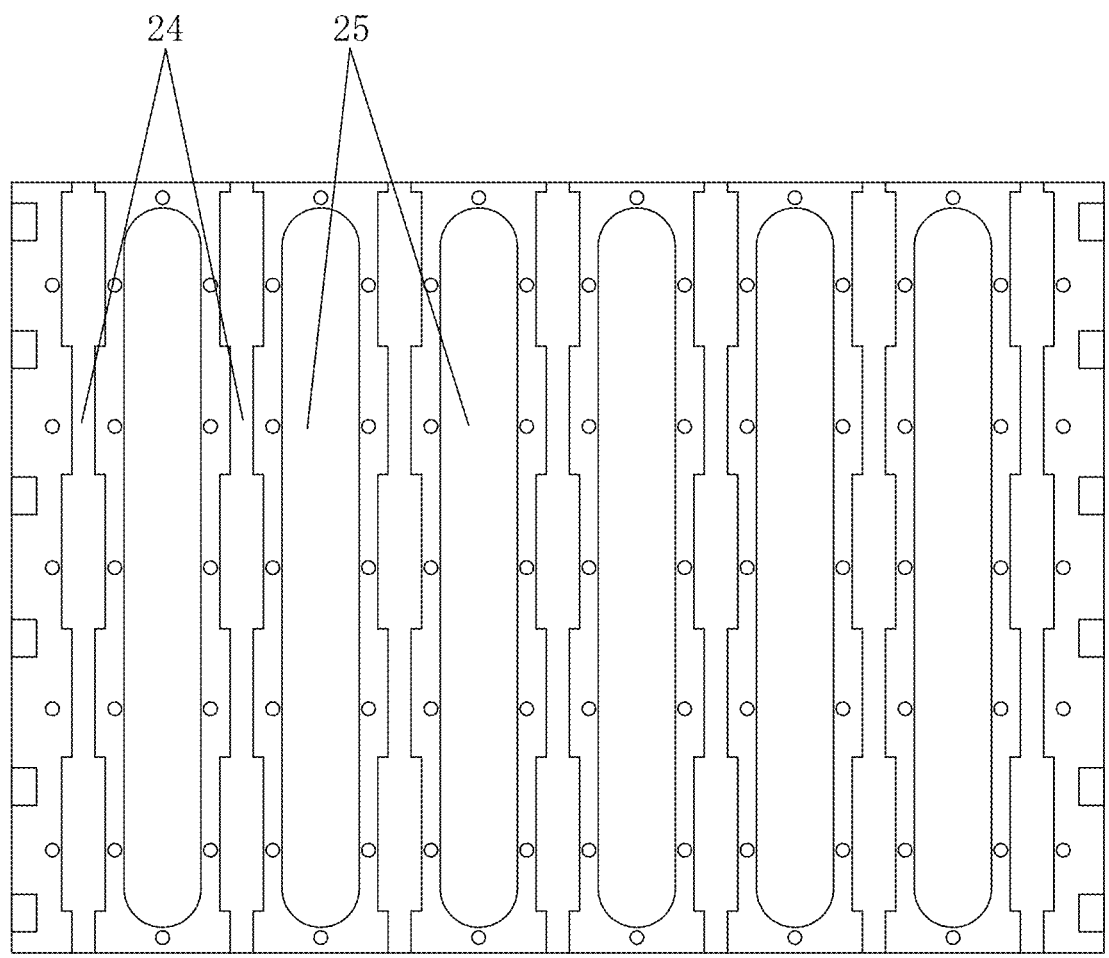
FIG. 6 is a schematic diagram of a cross plate structure of a self-adaptive additive manufacturing workbench according to an embodiment of the present disclosure.

Based on the low-stress self-adaptive manufacturing apparatus shown in FIG. 1, a corresponding multi-source self-adaptive low-stress additive manufacturing method as shown in FIG. 2 is provided, and the method includes the following steps A to E.

At step A, a residual stress distribution of the metal workpiece to be additive manufactured is analyzed according to the size and structure of the metal workpiece, an arrangement scheme of high-energy sound beam excitation unit(s) is formulated based on the residual stress distribution and the size of the workpiece to determine the number and mounting position(s) of the high-energy sound beam excitation unit(s) therefrom, corresponding one or more high-energy sound beam excitation units are arranged on an additive manufacturing platform to construct a high-energy sound beam regulation system, and a residual stress regulation system is formulated.

The one or more high-energy sound beam excitation units slide below the metal workpiece to be additive manufactured through a T-shape groove of the self-adaptive additive manufacturing workbench. The high-energy sound beam unit(s) is connected with titanium alloy special adiabatic amplitude transformer(s) via a coaxial screw rod, and the top portion(s) of the titanium alloy special adiabatic amplitude transformer(s) abuts against a side of the substrate on which the additive manufacturing is not conducted, so that the high-energy sound beam(s) is transmitted into the metal workpiece to be additive manufactured from the high-energy sound beam excitation unit(s).

The one or more high-energy sound beam excitation units are driven by the multichannel high-energy sound beam generator. The multichannel high-energy sound beam generator can simultaneously control the enabling and power of a plurality of high energy sound beam excitation units, and can separately control the time sequence of the plurality of high energy sound beam excitation units through the industrial personal computer.

At step B, an additive path is planed according to the size and the structure of the metal workpiece.

At step C, a substrate is fixed on a self-adaptive additive manufacturing workbench, and the substrate is polished and cleaned.

At step D, additive manufacturing of the metal workpiece is conducted and the high-energy sound beam regulation system is started synchronously to inject the high-energy sound beam(s) into the inside of the metal workpiece according to a time and/or space control sequence.

At step E, position information of molten pool(s) and position information of the high-energy sound beam excitation unit(s) are acquired in the additive manufacturing process in real time.

In the process of additive manufacturing, the position(s) of the molten pool(s) is close to the position(s) of the distal end(s) of the welding torch(es). The industrial personal computer reads the position data $(x_{r1}, y_{r1}, z_{r1})$ of the distal end(s) of the welding torch(es) held by the manipulator(s) from the respective manipulator controller(s) in real time.

The industrial personal computer performs centralized control on the high-energy sound beam generator, and adjusts the state information of the high-energy sound beam generator in real time based on the real-time position information of the molten pool(s), so as to generate time sequence logic for regulating the whole process. The state information of the high-energy sound beam generator mainly comprises enabling information and power information of the high-energy sound beam generator.

In the regulation process, the industrial personal computer monitors and records the coordinate data $(x_{r1}, y_{r1}, z_{r1})$ of the distal end(s) of the welding torch(es) held by the respective manipulator(s) in the additive manufacturing process in real time so as to obtain the position information of the molten pool(s), and adjusts the enabling condition and the power information of the high-energy sound beam generator according to the position(s) of the molten pool(s). According to the horizontal position data $(x_{rm}, y_{rm})$ of the respective welding torch(es) in the Cartesian coordinate system and the position $(x_n, y_n)$ of the respective high-energy sound beam excitation unit(s), $\Delta L_{(x,y)_n} = \sqrt{(x_n - x_{rm}) + (y_n - y_{rm})^2}$ is calculated. The switching condition of the respective high-energy beam excitation unit(s) is adjusted based on the size of $\Delta L_{(x,y)_n}$. According to the vertical height data $z_{rm}$ of the respective welding torch(es) in the Cartesian coordinate system and the vertical position data $z_n$ of the respective high energy sound beam excitation unit(s), $\Delta L_{hn}$ is calculated to adjust the power range $0 \sim W_n$, of the respective high energy sound beam excitation unit(s). If there are high-energy sound beam excitation unit(s) arranged below or near the position(s) of the molten pool(s), the high-energy sound beam excitation unit(s) below this position is closed, the nearby excitation unit(s) is adjusted to work at low power, while the high-energy sound beam excitation units at the other positions regulate at high power. With the increase of the number of additive layers and the elevation of the molten pool(s) in the vertical direction, the power of the high-energy beam excitation unit(s) is increased.

The industrial personal computer reads the coordinate data of the distal end(s) of the welding torch(es) held by the manipulator(s) and feeds the coordinate data back to the regulation system. The system feeds back and regulates the high-energy sound beam generator to realize that the high-energy sound beams are reflected to the area to be regulated of the workpiece in a uniform and lossless manner.

At step F, the surface temperature of the metal workpiece is continuously monitored when the additive manufacturing of the metal workpiece starts;

At step G, the high-energy sound beam regulation system is closed when the additive manufacturing of the metal workpiece is finished and the surface temperature of the metal workpiece is reduced to the room temperature.

Through the steps described above, the residual stress is regulated in the additive manufacturing process, the position of each molten pool is acquired in real time, the industrial personal computer adjusts the enabling and power of the high-energy sound beams in a multi-channel self-adaptive mode based on the relative distance between each high-energy sound beam excitation unit and the molten pool, the residual stress of the workpiece is reduced and homogenized without affecting the solid solution process of the molten pool, and the mechanical property of the workpiece and the reliability of the additive manufacturing are improved.

Figure 7:
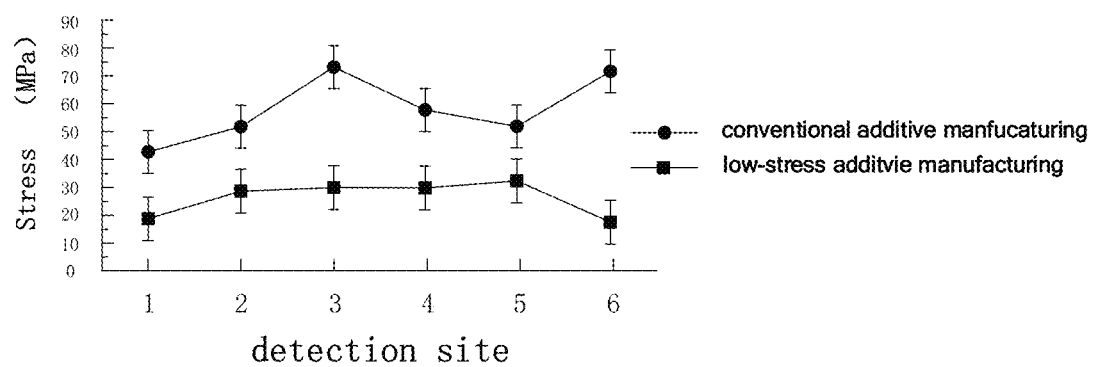
FIG. 7 shows the comparison of residual stress detection results of the metal workpieces prepared with the same metal by conventional and low-stress additive manufacturing.

As shown in FIG. 7, residual stress detection results of the metal workpiece prepared with the same metal ZL1 14A wire by conventional and low-stress additive manufacturing are compared. It is clear from the graph that the residual stress of the metal workpiece manufactured by the method and the apparatus of the present disclosure is significantly reduced at each point, indicating that the method and the apparatus of the present disclosure is effective in eliminating residual stress.

It should be noted that the embodiments described in the present disclosure are only a part of the embodiments of the application, and not all of the embodiments. The components of the embodiments of the present disclosure, as generally described and illustrated in the figures herein, may be arranged and designed in a wide variety of different configurations. Thus, the above detailed description of the embodiments of the present disclosure, as provided in the annexed drawings, is not intended to limit the scope of the disclosure, but merely representative of selected embodiments of the disclosure. All other embodiments, which can be derived by those skilled in the art from the embodiments of the present disclosure without making any creative effort, shall fall within the protection scope of the present disclosure.

The terms first, second, third, or module A, module B, module C, or the like in the specification and the claims, may be used solely to distinguish one from another and are not intended to imply a particular order to the objects, but rather are to be construed in a manner that allows interchanging particular sequences or orderings where appropriate so that embodiments of the present disclosure may be practiced otherwise than as specifically illustrated or described herein.

In the above description, the labels involved to represent the steps do not necessarily indicate that they will be performed in that order, and may include intermediate steps or be replaced by other steps, and the order of the previous and subsequent steps may be interchanged or performed simultaneously where appropriated.

The term "comprising" as used in the specification and claims should not be construed as being limited to the items listed thereafter; it does not exclude other elements or steps. It shall, therefore, be interpreted to specify the existence of the said features, objects, steps or parts referred to, without excluding the existence or addition of one or more other features, objects, steps or parts and the group thereof. Thus, the expression "an apparatus comprising a device A and a device B" should not be limited to an apparatus consisting of a device A and a device B.

Reference in the specification to "one embodiment" or "an embodiment" means that a particular feature, structure, or characteristic described in connection with the embodiment is included in at least one embodiment of the disclosure. Thus, the phrases "in one embodiment" or "in an embodiment" in various places throughout this specification are not necessarily all referring to the same embodiment, but may. Furthermore, in various embodiments of the present disclosure, unless otherwise specified or conflicting, terms and/or descriptions between different embodiments have consistency and may be mutually referenced, and technical features in different embodiments may be combined to form new embodiments according to their inherent logical relationships.

It is noted that the foregoing is only illustrative of the preferred embodiments of the present disclosure and the technical principles employed. Those skilled in the art will appreciate that the present disclosure is not limited to the particular embodiments described herein, and that various obvious changes, rearrangements and substitutions will now be apparent to those skilled in the art without departing from the scope of the disclosure. Therefore, although the present disclosure has been described in more detail with reference to the above embodiments, the present disclosure is not limited to the above embodiments, and may include other equivalent embodiments without departing from the spirit of the present disclosure.

What is claimed is:

1. A multi source self-adaptive low-stress additive manufacturing apparatus, comprising:
   a multi-axis manipulator additive manufacturing system, a high energy sound beam regulation system, a substrate and a self-adaptive additive manufacturing workbench; wherein
   the additive manufacturing workbench is in screw connection with the substrate and is configured for fixing a metal workpiece to be additive manufactured;
   the multi-axis manipulator additive manufacturing system comprises a multi-axis manipulator, a welding torch, a manipulator controller and a guide rail,
   wherein a base of the multi-axis manipulator is connected with the guide rail in a slidable manner, the welding torch is held by a distal end of the multi-axis manipulator, the multi-axis manipulator is controlled by the manipulator controller to move the welding torch to conduct additive manufacturing on the metal workpiece to be additive manufactured; and
   the sound beam regulation system includes one or more sound beam exciters, each of which has a sound beam excitation unit and an adiabatic amplitude transformer, wherein the sound beam excitation unit is connected to the adiabatic amplitude transformer by a coaxial screw rod, and a top end face of the adiabatic amplitude transformer abuts against a side of the substrate on which the additive manufacturing is not conducted so as to realize the regulation of residual stress generated in the additive manufacturing process of the metal workpiece,
   wherein the one or more sound beam exciters each further includes an amplitude transformer fixing plate to which the adiabatic amplitude transformer is connected through hexagon socket head screws, and springs are arranged therebetween so that a movement amplitude of the adiabatic amplitude transformer in the up-and-down direction has a 1-2 mm allowance; and
   T-shaped screw nuts are mounted at three corners of the amplitude transformer fixing plate to allow free sliding in a T-shape groove of the self-adaptive additive manufacturing workbench, and the amplitude transformer fixing plates are capable of splicing with each other.

2. The apparatus of claim 1, wherein a frequency range of sound beams emitted by the one or more sound beam exciters is 5.0-40.0 KHz, and the power of a single sound beam exciter is more than 1.0 W.

3. The apparatus of claim 2, wherein the titanium adiabatic amplitude transformer is a ¼ wavelength adiabatic amplitude transformer or a ½ wavelength adiabatic amplitude transformer.

4. The apparatus of claim 3, wherein the adiabatic amplitude transformer is coupled to a side of the substrate on which the additive manufacturing is not conducted in the additive manufacturing process via a heat-resisting sound-transmitting rubber or a heat-resisting lubricant.

5. The apparatus of claim 1, wherein the manipulator controller is electrically connected with the multi-axis manipulator and is configured for controlling sliding of the multi-axis manipulator on the guide rail and controlling a moving trajectory of the multi-axis manipulator.

6. The apparatus of claim 5, wherein the multi-axis manipulator additive manufacturing system further comprises a welder controller, which is electrically connected with the welding torch and configured for controlling the welding torch and acquiring position information of the distal end of the welding torch.

7. The apparatus of claim 6, wherein the sound beam regulation system further comprises a sound beam generator, which is electrically connected to the one or more sound beam exciters to drive the one or more high energy sound beam exciters to emit sound beams.

8. The apparatus of claim 7, further comprising an industrial personal computer, which is electrically connected with the manipulator controller, the welder controller, the sound beam generator and a temperature detection device, respectively, to monitor and control of the additive manufacturing process of the metal workpiece to be additive manufactured, regulation process of the residual stress, and a surface temperature of the metal workpiece.

9. The apparatus of claim 1, wherein the self-adaptive additive manufacturing workbench is provided with T-shaped grooves and long circular grooves for adapting the one or more sound beam exciters to the metal workpiece with different structures.

* * * * *